United States Patent [19]

Ueda

[11] Patent Number: 4,516,597

[45] Date of Patent: May 14, 1985

[54] ANTICORROSIVE BUTTERFLY VALVE

[75] Inventor: Tomoyuki Ueda, Nobeoka, Japan

[73] Assignee: Asahi Yukizai Kogyo Co., Ltd., Japan

[21] Appl. No.: 481,388

[22] Filed: Apr. 1, 1983

[51] Int. Cl.³ ............................................. F16L 27/00
[52] U.S. Cl. .................................... 137/314; 137/375; 251/306
[58] Field of Search ................ 137/375, 314; 251/305, 251/306

[56] References Cited

U.S. PATENT DOCUMENTS

| | | | |
|---|---|---|---|
| 3,073,336 | 1/1963 | Johnson | 137/375 |
| 3,143,132 | 8/1964 | Pangburn | 137/375 |
| 4,008,734 | 2/1977 | Shimono et al. | 137/314 |
| 4,266,754 | 5/1981 | Ninomiya et al. | 137/375 |

Primary Examiner—A. Michael Chambers
Assistant Examiner—Sheri Novack
Attorney, Agent, or Firm—Burns, Doane, Swecker & Mathis

[57] ABSTRACT

A butterfly valve resistant to corrosive gases. The valve body carries a valve seat ring having an elastic layer and an inner lining layer composed of polyvinylidene difluoride. The moisture permeability of the elastic layer is higher than that of the lining layer. On the outer surface of the valve seat ring facing the valve body, annular grooves are formed. Through the wall of the valve body, there are formed vents for moisture. These annular grooves and vents for moisture are communicated with each other. When the moisture contained in corrosive gases permeates through the lining and elastic layers, such moisture will easily be drained through the vents. Thereby, moisture permeated through the valve seat ring will not accumulate between the valve seat ring and the valve body. This prevents deformation of the valve seat ring, and extends valve use.

6 Claims, 4 Drawing Figures

ANTICORROSIVE BUTTERFLY VALVE

BACKGROUND OF THE INVENTION

1. Field of the Invention

The present invention relates to an improvement of a butterfly valve, more particularly, to butterfly valve resistant to corrosive gases having a high temperature of more than 70° C.

2. Description of the Prior Art

To improve the anticorrosive performance of butterfly valves, it has been well known to provide a coating layer of fluororesin or the like on the fluid contacting surfaces of the valve disk as well as the valve body.

The present inventor has previously developed an anticorrosive butterfly valve with the valve disk coated with polytetrafluoro ethylene (PTFE) and with the valve seat ring (made of natural or synthetic rubber), extending along the inner surface of the valve body, lined with polyvinylidene difluoride (PVDF). Since the valve seat ring is composed of an inner layer of PVDF and an outer layer of rubber or its equivalent, the contact between the valve disk and the valve body can be considerably improved (refer to Japanese Examined Patent Publication (Kokoku) No. 56-31464).

However, this type of butterfly valve has been found to have several drawbacks. Namely, while the gas permeability of the PVDF lining the rubber layer of the valve seat ring is very low, e.g., $9.32 \times 10^{-10}$ cc·cm/cm$^2$·sec·cmHg for gaseous chlorine at 80° C., and, thus, in use for pipe lines conveying, for example, gaseous chlorine of a high temperature of more than 70° C., almost no dry gaseous chlorine will permeate through the lining layer to the rubber layer, preventing corrosion of the rubber layer by the gaseous chlorine, the moisture permeability of the PVDF is considerably high e.g., $230 \times 10^{-10}$ cc.cm/cm$^2$·sec·cmHg for gaseous chlorine is at 40° C. and $516 \times 10^{-10}$ cc·cm/cm$^2$·sec·cmHg at 80° C. Thus, the moisture contained in the gaseous chlorine tends to permeate through the lining layer into the elastic layer.

If the elastic layer of the valve seat ring is made from material with no moisture permeability or lower moisture permeability than that of PVDF, the moisture contained in the gaseous chlorine tends to permeate into the clearance between the PVDF layer and the elastic layer after a long period of valve use. This results in the detaching of the adhesive between the PVDF layer and the elastic layer and in the accumulation of the permeated moisture in the resultant space. Thus accumulated moisture pushes up the PVDF layer. Thus, during on-off operation of the valve, the PVDF layer tends to be broken by repeated frictional contact against the valve disk. Accordingly, corrosion of the elastic layer by gaseous chlorine is caused and the sealing function of the valve is lost.

On the other hand, if the moisture permeability of the elastic layer of the valve seat ring is higher than that of the PVDF layer, the moisture of the gaseous chlorine permeates through the PVDF layer and the elastic layer to accumulate in the clearance between the elastic layer and the valve body. This results in the undesired deformation of the elastic layer and reduced sealing function of the valve.

SUMMARY OF THE INVENTION

It is the main object of the present invention to provide an improved butterfly valve which can substantially obviate the aforementioned conventional drawbacks and can provide a high anticorrosive performance for extended valve use.

After repeated research, present inventor solved the problem by exhausting the moisture contained in the corrosive gases, permeated through the PVDF layer and the elastic layer, outside of the valve.

The anticorrosive butterfly valve according to invention comprises a valve body, a fluid passageway within the valve body, and a valve disk mounted for rotation within the passageway about an axis located at right angles to the axis of the passageway. The valve body is adapted to carry an annular valve seal ring which projects within the interior of the passageway. The valve disk is composed of PTFE, while the valve seal ring is formed of an elastic layer lined by a PVDF layer.

In accordance with the invention, the elastic layer of the valve seat ring is made from a material having a higher moisture permeability than that of PVDF. On the outer surface of the valve seat ring, annular grooves in the shape of a circle are provided around openings for receipt of upper and lower ends of a valve stem of the valve disk. On the outer surface of the elastic layer facing the valve body, two or more parallel annular grooves are provided. The circular and parallel annular grooves are communicated with each other. Two or more vents for the moisture are passed through the wall of the valve body substantially in the radial direction to the axis of the valve body, which communicate with all of the circular and parallel annular grooves.

The advantage offered by the present invention is that there is no accumulation of the moisture contained in the corrosive gas in the clearance between the lining layer and the elastic layer, whereby detachment of the layers and deformation of the elastic layer may be completely prevented.

BRIEF DESCRIPTION OF THE DRAWINGS

Further characteristics and advantages of the present invention will become apparent from the following description made with reference to the attached drawings, in which similar reference numerals and characters denote similar elements, wherein.

DESCRIPTION OF THE PREFERRED EMBODIMENT

Figure 1:
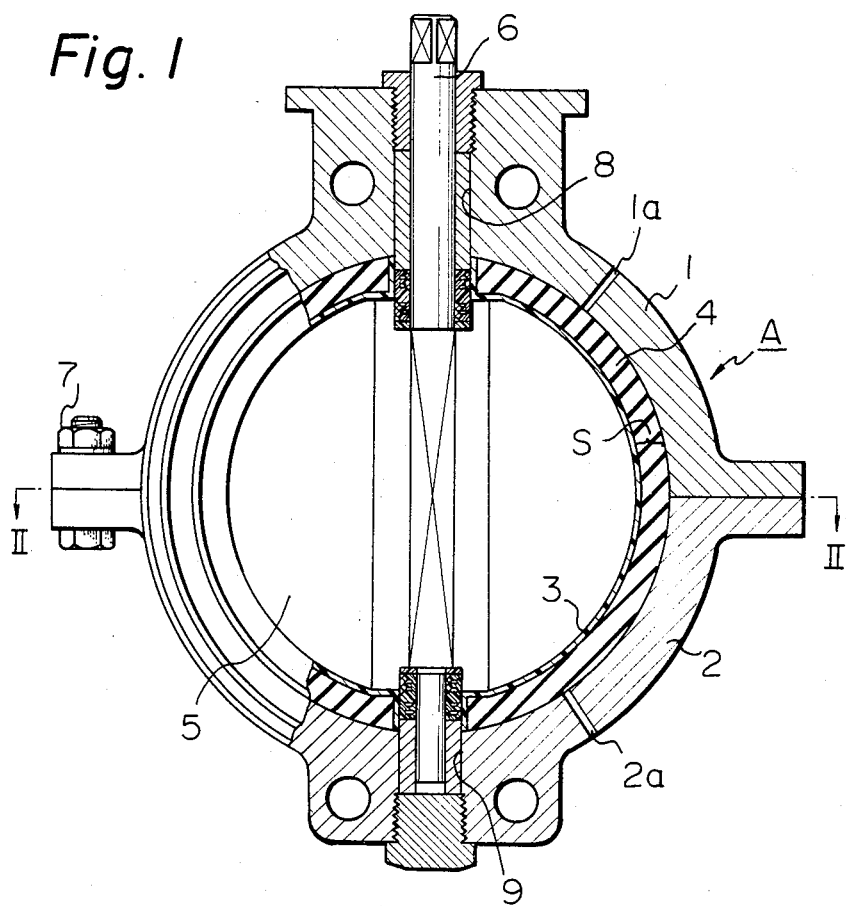
FIG. 1 is an axial and longitudinal section partially representing an elevation of an embodiment of an anticorrosive butterfly valve according to the present invention.

Now, a preferred embodiment of the present invention will be described in detail in reference to the attached drawings. As shown in FIG. 1, a valve body A comprises two body halves 1 and 2 detachably joined together by means of a plurality of sets 7 of fixing bolts and nuts.

Figure 2:
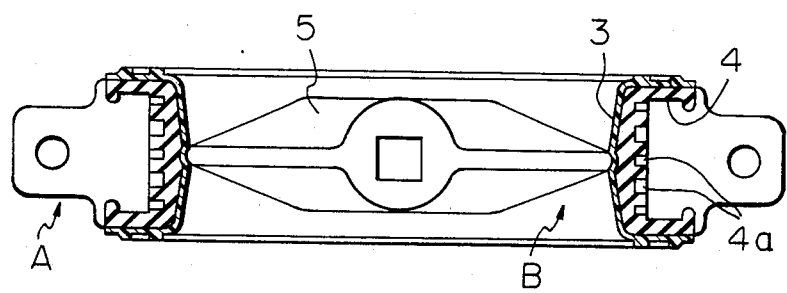
FIG. 2 is a cross-sectional view of the anticorrosive butterfly valve shown in FIG. 1 taken along line II—II.

Seen in its assembled state, the valve is provided with a circular cylindrical bore B at its central portion, as shown in FIG. 2. Bore B serves as the passageway for gaseous fluid. The flow rate of the fluid can be controlled by turning a valve disk 5.

On the inside surface of bore B, a valve seat ring S having a circular cylindrical bore at its central portion is detachably fitted. The valve seat ring S is composed of an elastic layer 4 and a PVDF layer 3 lined inside of the elastic layer 4. These layers 3 and 4 are firmly attached with each other to provide unitary valve seat ring S.

On the upper and lower portions of the valve seat ring S and in the valve body A, there are provided two openings 8 and 9. The openings 8 and 9 cooperatively serve to receive the upper and lower end portions of a turnable valve stem 6 of a circular valve disk 5, which extends along the axis perpendicular to the axis of the fluid passage bore B. The valve disk 5 is composed of PTFE and supported in the valve body A by means of the valve stem 6.

As previously described, since the gas permeability of PVDF is considerably low even if the thickness of the lining layer 3 is relatively small, deterioration of the elastic layer 4 by the corrosive gas can be effectively prevented. However, since the moisture permeability of PVDF is considerably high, the moisture contained in the corrosive gas, even if small in percentage, will tend to permeate through the PVDF layer 3 into the elastic layer 4.

In the embodiment, phenolic adhesive is used to adhere the PVDF layer 3 to the elastic layer 4 so as to reduce the effect of the moisture permeating the PVDF layer 3 and to increase the contact between the PVDF layer 3 and the elastic layer 4.

According to the present invention, the elastic layer 4 is selected from substances having a higher moisture permeability than that of PVDF. The moisture of the gaseous chlorine permeating through the PVDF layer 3 will, therefore, permeate through the elastic layer 4 without accumulating between the PVDF layer 3 and the elastic layer 4.

In general, natural rubber or synthetic rubber is used as the material of the elastic layer 4. Some suitable synthetic rubber materials are polychloroprene rubber (CR), acrylonitrile butadiene rubber (NBR), and ethylene propylene terpolymer (EPT), all of which have a high moisture permeability. The moisture permeability of CR and NBR is about $1800 \times 10^{-10}$ cc·cm/cm$^2$·sec·cmHg at 40° C., and that of EPT is about $900 \times 10^{-10}$ cc·cm/cm$^2$·sec·cmHg at the same temperature.

Figure 3:
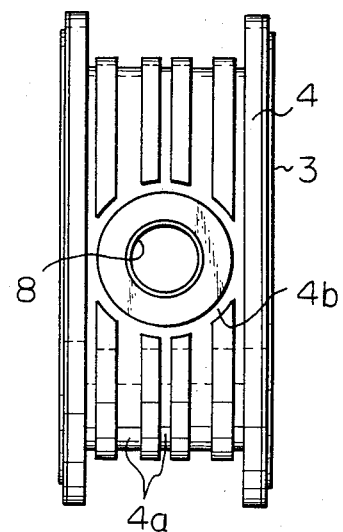
FIGS. 3 and 4 are enlarged front and perspective views of the valve seat ring taken from the embodiment, in which the axial length thereof is exaggerated.
Figure 4:
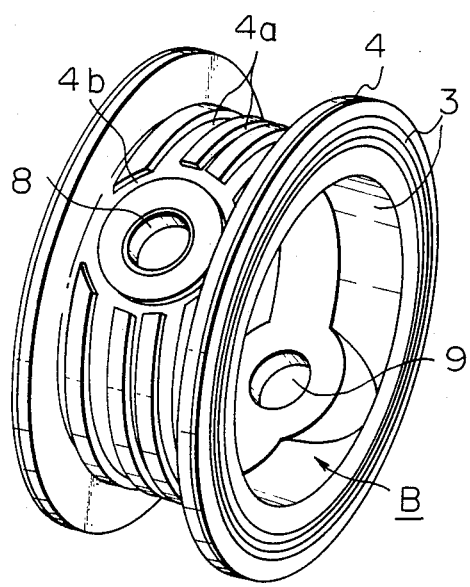

As can be seen in FIGS. 2 to 4, on the outer surface of the elastic layer 4 facing bore B of the valve body A, two or more parallel annular grooves 4a are formed (in this embodiment, five grooves are reperesented). The moisture permeated through the elastic layer 4 is downwardly trickled along the annular grooves 4a and accumulate in the bases thereof. It should be noted that, in the above description, "downwardly" does not mean in a downward direction with respect to the drawings, but a direction with respect to the real positon of the valve.

The annular grooves to be formed are not limited in number, however, three to five are preferably utilized in the valve of the present invention. The grooves 4a do not need to be formed with the same width. The arrangement of these grooves is preferably selected so that the grooves are arranged in substantial symmetry with each other, relative to the contracting line between the outer periphery of the valve disk 5 and the inner surface of the PVDF layer 3 seen in the closed postion of the valve disk 5, and so that they are uniformly distributed along the entire width of the elastic layer 4 measured in the axial direction thereof.

Since the valve is constructed as described above, the stress applied upon the elastic layer 4 may be uniformly distributed, during the valve on-off operation. The depth of each annular groove 4a is preferably in the order of $\frac{1}{3}$ to $\frac{1}{4}$ of the thickness of the elastic layer 4.

As shown in FIGS. 3 and 4, annular grooves 4b are formed around the openings 8 and 9 and on the outer surface of the valve seat ring S facing the valve body A. As described previously, the openings 8 and 9 are provided on the upper and lower portions of the valve seat ring S. The valve stem 6 is passed through the openings 8 and 9. The annular grooves 4a and 4b are communicated with each other on the outer surface of the valve seat ring S.

Reference numerals 1a and 2a are vents for the moisture, formed substantially in the radial direction with respect to the axis of the valve and through the wall of the valve body A. These vents 1a and 2a are communicated with the annular grooves 4a and 4b so as to drain the moisture accumulated in the annular grooves 4a and 4b. The valve installing conditions should be considered in determining the location of the vents 1a and 2a around the valve body A. The number and diameter of the vents 1a and 2a are preferably 2 to 6 and 3 to 10 mm, respectively.

If the annular grooves 4a and 4b are not communicated with each other, vents for moisture passing through the valve body A must be designed to communicate with all annular grooves 4a and 4b. This would increase the number of vents and reduce the mechanical strength of the valve body A. Contrary to the above, when the annular grooves 4a and 4b are communicated with each other, as in the present invention, a single vent communicated with one of the annular grooves 4a and 4b can control the drainage of all annular grooves 4a and 4b, i.e., the accumulated moisture in the annular grooves 4a and 4b will trickle together toward the single vent. This does not reduce the mechanical strength of the valve body A.

As described above, the butterfly valve according to the present invention comprises a valve seat ring having an elastic layer and a PVDF layer lined on the elastic layer. The moisture permeability of the elastic layer is higher than that of the PVDF layer. On the outer surface of the elastic layer, there are formed parallel annular grooves and other annular grooves around the opening intended to receive the valve stem. Furthermore, vents for moisture are formed through the wall of the valve body. All of the annular grooves and the vents are communicated with each other. Thus the moisture contained in a corrosive gas of a high temperature of more than 70° C. can be exhausted outside the valve body.

It should be noted that, in the previous description, "moisture" means a vapor or solution containing a small amount of corrosive gas. Also, the parallel annular grooves do not have to surround the entire perimeter of the elastic layer of the valve seat ring. For instance, they can be designed to be along a length less than that of the entire perimeter of the elastic layer.

As will readily be understood, the invention is not limited to the example of construction described in the foregoing. Many modifications may accordingly be contemplated without thereby departing either from the scope or the spirit of the invention. For example, the valve of the invention can be applied for corrosive liquid instead of high temperature corrosive gas.

I claim:

1. An anticorrosive butterfly valve comprising a valve body, a fluid passageway within said valve body, and a valve disk mounted for rotation within said passageway about an axis located at right angles to the axis of the passageway, the valve body being adapted to carry an annular valve seat ring which projects within the interior of said passageway, said valve disk being composed of polytetrafluoro ethylene and said valve seat ring being formed of an elastic layer lined by a polyvinylidene difluoride layer, said elastic layer of the valve seat ring being made from a material having a higher moisture permeability than that of polyvinylidene difluoride; on the outer surface of the valve seat ring, circular grooves are provided annularly around openings for receiving the upper and lower ends of a valve stem of the valve disk; on the outer surface of the elastic layer facing the valve body, a plurality of parallel annular grooves are provided, said circular and parallel grooves being communicated with each other such that a continuous fluid path is formed in the outer surface of the valve seat ring; and a plurality of vents for moisture are passed through the wall of the valve body substantially in radial directions toward the axis of the valve body and are communicated with said circular and parallel grooves.

2. An anticorrosive butterfly valve according to claim 1, characterized in that said elastic layer of the valve seat ring is made from polychloroprene rubber, acrylonitrile butadiene rubber, or ethylene propylene terpolymer.

3. An anticorrosive butterfly valve according to claim 1, characterized in that said parallel annular grooves formed on the outer surface of the valve seat ring are three to five in number.

4. An anticorrosive butterfly valve according to claim 1, characterized in that the depth of each parallel annular groove formed on the outer surface of the valve seat ring is $\frac{1}{8}$ to $\frac{1}{4}$ of the thickness of the elastic layer.

5. An anticorrosive butterfly valve according to claim 1, characterized in that said vents for moisture formed through the wall of the valve body are two to six in number.

6. An anticorrosive butterfly valve according to claim 1, characterized in that the diameter of said vents for moisture formed through the wall of the valve body is 3 to 10 mm.

* * * * *